United States Patent [19]
Pallari

[11] Patent Number: 5,179,985
[45] Date of Patent: * Jan. 19, 1993

[54] LIFTING AND CRUSHING APPARATUS FOR TREE STUMPS

[76] Inventor: Olli Pallari, SF-95300 Tervola, Finland

[ * ] Notice: The portion of the term of this patent subsequent to Jan. 14, 2009 has been disclaimed.

[21] Appl. No.: 819,898

[22] Filed: Jan. 13, 1992

Related U.S. Application Data

[63] Continuation of Ser. No. 509,047, Apr. 13, 1990, Pat. No. 5,081,151.

[51] Int. Cl.⁵ .......................... E02F 3/28; B27C 9/00; B23P 19/00
[52] U.S. Cl. .................................. 144/359; 30/134; 30/228; 37/117.5; 83/609; 144/34 E; 144/335; 144/2 N
[58] Field of Search ............... 144/2 N, 34 R, 34 E, 144/335, 359; 30/134, 228, 267; 294/88, 104; 37/2 R, 117.5, 103, DIG. 3; 83/609, 928

[56] References Cited

U.S. PATENT DOCUMENTS

| | | | |
|---|---|---|---|
| 3,814,152 | 6/1974 | Pallari | 144/2 N |
| 4,188,721 | 2/1980 | Ramun et al. | 30/134 |
| 4,439,921 | 4/1984 | Ramun et al. | 30/134 |
| 4,519,135 | 5/1985 | LaBounty | 30/134 |
| 4,616,417 | 10/1986 | Gross | 30/134 |
| 4,686,767 | 8/1987 | Ramun et al. | 30/134 |

FOREIGN PATENT DOCUMENTS 7703881-8 6/1982 Sweden.

Primary Examiner—W. Donald Bray
Attorney, Agent, or Firm—Pearne, Gordon, McCoy & Granger

[57] ABSTRACT

A stump lifting and crushing device for mounting to an end of a bucket arm of a digging machine includes stump lifting hooks and a bit pivotally closable with a counter bit for crushing stumps therebetween. The bit has an elongate narrow cutting surface which cooperates with an aligned counter surface provided by the counter bit. The counter surface extends transversely across the width of the cutting surface of the bit. The closing movement of the bits is limited by the cam-like engagement of a following member of the bit with a stop member of the counter bit.

10 Claims, 2 Drawing Sheets

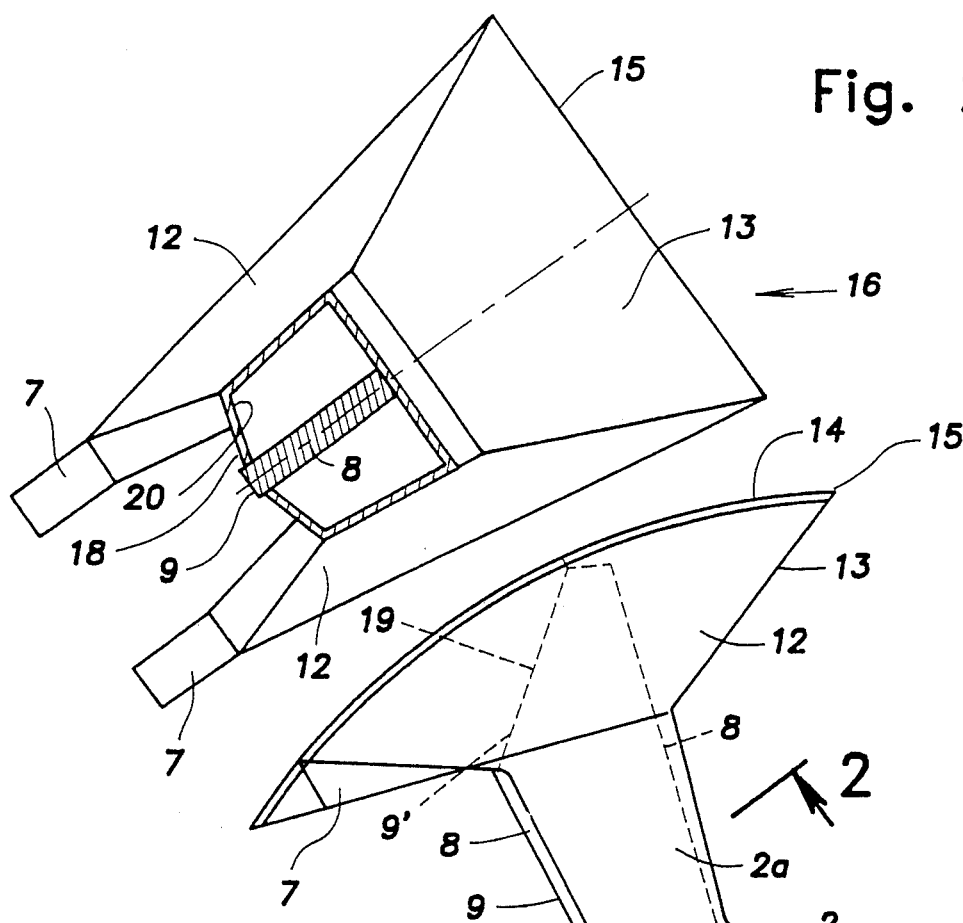
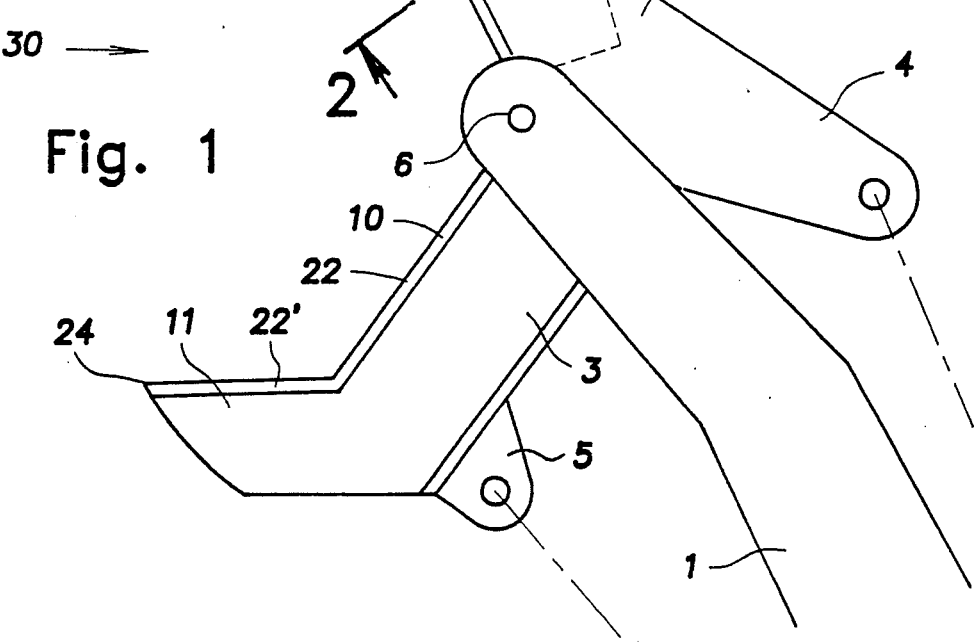

LIFTING AND CRUSHING APPARATUS FOR TREE STUMPS

This is a continuation of application Ser. No. 07/509,047, filed Apr. 13, 1990 U.S. Pat. No. 5,080,151.

The present invention relates to a tree stump lifting and crushing apparatus adapted to be mounted to a powered, manipulatable boom such as a bucket arm of a digging machine. The apparatus comprises one or more lifting hooks and a bit which is pivotable and turnable against a counter bit for crushing stumps therebetween.

This type of apparatus is disclosed in Swedish patent publication 378,502. In that publication, a splitting bit is pressed between two counter bits disposed at the adjacent upper edges of stump supporting arms. The bit and counter bits are arcuately shaped throughout their lengths. This arrangement of the bits has several disadvantages. The slit between the counter bits tends to get clogged with debris, especially at the base section of the slit. Further, the manufacture of the bits is a long process requiring a high degree of accuracy since the pivotable bit must be exactly aligned with the slit between the counter bits. Also, rocks coming up with stump roots may penetrate or lodge in the slit between the counter bits and damage them. Furthermore, the arcuate design of the bits leads to difficulties when replacing dulled bits.

SUMMARY OF THE INVENTION

In accordance with the invention, a pivotably closable bit and counter bit include a cutting surface and a counter surface. The counter surface is substantially continuous and extends across the width of the cutting surface upon closing movement of the bits. The bit and counter bit also include closure stop means to prevent destructive engagement of the cutting surface and counter surface. Stumps may therefore be firmly grasped and cut or crushed with a reduced risk of damage to the cutting and/or counter surfaces due to damaging contact between the surfaces or with inadvertently entrapped debris as compared with prior art devices.

The closure stop means are located remote of the cutting and counter surfaces to minimize any interference therewith. Accordingly, stumps disposed between the cutting and counter surfaces may be subjected to the full closure stroke of the bits. The remote location of the closure stop means also minimizes unnecessary wear and risk of damage thereto during the lifting and crushing or cutting of stumps.

The closure stop means comprise a following member and a stop member mounted to the bits for camlike engagement and arranged to maintain a slight spacing or a minimal, non-damaging contact pressure between the cutting and counter surfaces upon closure of the bits. The cam-like engagement of the members minimizes the required accuracy of manufacture and assembly of the components.

The cutting and counter surfaces include substantially straight or linear portions radially extending from a pivot axis about which the bits rotate. The following and stop members are located on angularly extending portions of the cutting and counter surfaces.

The counter surface is provided by a plate member mounted within a housing in the illustrated embodiment. The plate member also serves as a structural element of the housing since it reinforces and strengthens the housing. The housing includes a tapered cross-sectional configuration including an end wall extending toward stump lifting hooks. The end wall has an area sufficient to provide a support surface for working against the ground as the stump lifting hooks are used to pry a tree stump from rooted engagement with the ground.

It is therefore an object of the invention to provide an improved means for the lifting and crushing of stumps which avoids problems of prior art devices. This object is achieved by means of the characterizing features appearing in the accompanying claims.

BRIEF DESCRIPTION OF THE DRAWINGS

The following is a description of a preferred embodiment of the invention with reference made to the accompanying drawing, in which:

FIG. 1 is a side view of the stump lifting and crushing apparatus of the invention mounted on the end of the bucket arm, the bits being disposed in an open position;

FIG. 2 is a sectional view taken along line II—II in FIG. 1;

DETAILED DESCRIPTION OF THE DRAWINGS

Figure 5:
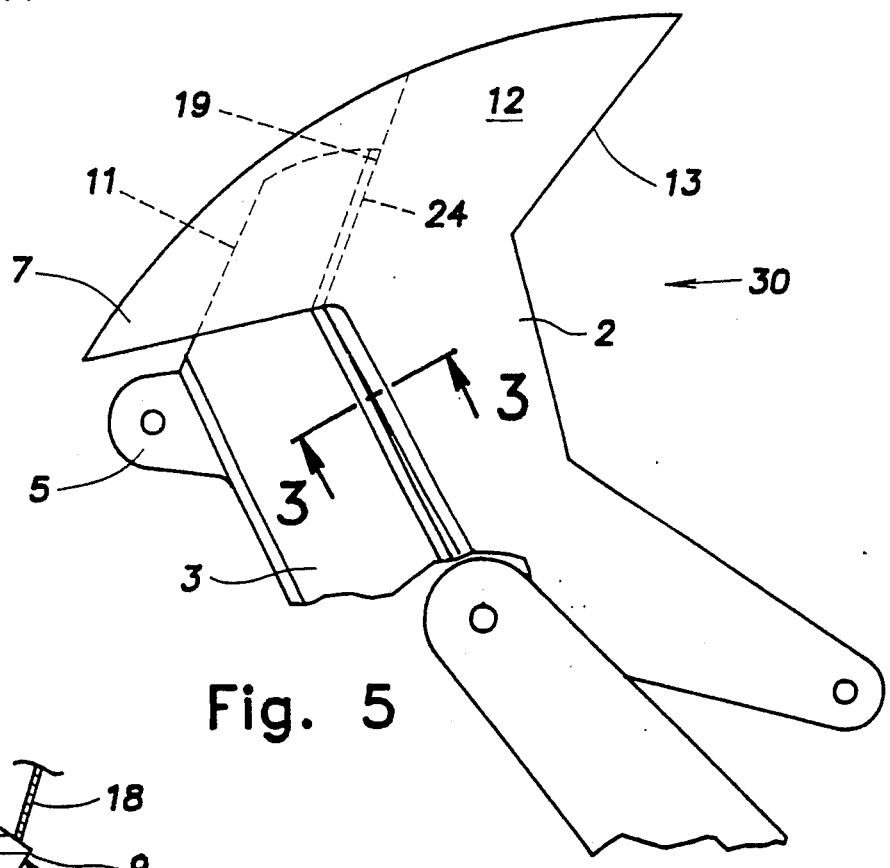
FIG. 5 is a view similar to FIG. 1 showing the bits in a closed position.

Referring to FIGS. 1 and 2, a tree stump lifting and crushing apparatus 30 in accordance with the invention is shown attached to an end of a bucket arm 1 of a digging machine (not shown). The bucket arm 1 is powered for manipulation by an operator in a known manner. The major elements of the apparatus 30 comprise a housing assembly 2 including a counter bit 8 and an opposing bit assembly 3 including a cutting bit 10. The assemblies 2 and 3 are arranged for closing pivotal movement about a pivot axis 6. To that end, the assembly 2 includes a lug 4 and the assembly 3 includes a lug 5 for connection to actuators such as hydraulic actuators. In this manner, the assemblies 2 and 3 may be rotated about pivot axis 6 from their open position shown in FIG. 1 to a closed position as shown in FIG. 5.

Figure 4:
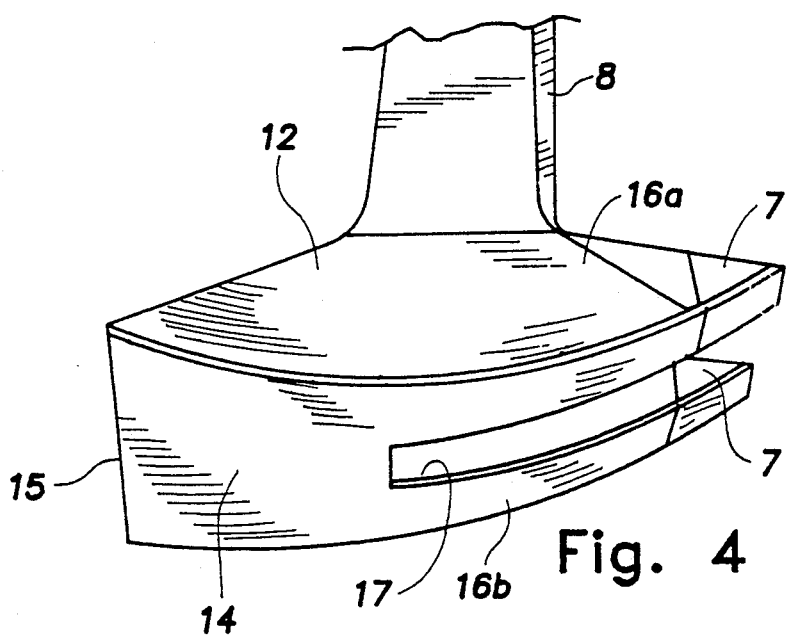
FIG. 4 is a perspective view showing the stump lifting or crushing apparatus as viewed from the remote end thereof.

The housing assembly 2 includes a housing 16 comprising a front wall 18, opposed sidewalls 12, a rear wall 13 and an end wall 14. As best shown in FIG. 4, the housing 16 is bifurcated or forked adjacent the forward portion thereof to provide a claw hammer-like configuration for facilitating the prying of stumps from the ground. Accordingly, the housing 16 includes forward legs 16a and 16b separated by a slot or elongate opening 17. A stump hook 7 is mounted adjacent the forward extremity of each of the legs 16a and 16b. The opening 17 is relatively wide throughout its length in order to avoid clogging with rock, earth or debris during stump removal operations.

The walls 12, 13 and 18 of the housing 16 taper outwardly in a direction extending radially from the pivot axis 6. Accordingly, a cavity 20 of increasing cross-sectional area in a radially outward direction from the pivot axis 6 is provided by the housing 16.

Figure 3:
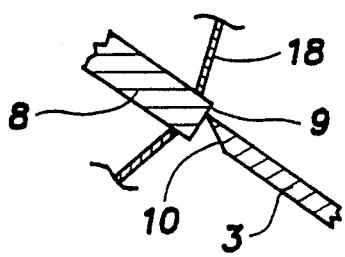
FIG. 3 is a sectional view taken along line III—III in FIG. 5.

The counter bit 8 is mounted within the cavity 20 and protrudes through the front wall 18 to a planar counter surface 9. The counter bit 8 is attached to the adjacent edges of the wall 18 in a suitably rigid manner, such as by welding, as best shown in FIG. 3. It should be appreciated that the counter bit 8 comprises a relatively thicker metal plate as compared with the thicknesses of the metal plate forming the walls of the housing 16 and therefore substantially reinforces and strengthens the housing.

The counter surface 9 extends generally radially from the pivot axis 6 to an angularly intersecting surface 9' having a remote portion which provides a stop member 19 as described below in greater detail. The counter bit 8 has a first side face which provides the counter surface 9 and an intersecting second side face which provides the surface 9' as well as the stop member 19 in the illustrated embodiment. Accordingly, the stop member 19 is integrally formed with the counter bit 8 and comprises a remote portion of the side face of the counter bit.

The bit 10 has a tapered or sharpened cutting surface 22 extending substantially radially from the pivot axis 6 to an angularly intersecting cutting surface 22'. The cutting surface 22' extends along a hook-shaped section 11 of the bit assembly 3. The stump hooks 7 and hook section 11 cooperate to grasp stumps as they are being crushed and/or cut between the cutting surface 22 and counter surface 9. In this manner, the tendency of the stump to escape outwardly from the pivot axis 6 is restricted.

A following member 24 is provided adjacent a remote extremity of the cutting surface 22' of the bit 10. The following member 24 may be integrally formed with the bit 10 and provided with a flat or planar surface. As best shown in FIG. 5, the following member 24 is arranged to engage the stop member in order to prevent destructive engagement between the cutting surface 22 and counter surface 9. Upon closing movement of the bit 10 and counter bit 8, the following member 24 engages the surface of the stop member 19 at a small angle to provide cam-like sliding engagement therewith. The cutting surface 22' is also prevented from contacting the surface 9'. Accordingly, the hook-shaped section 11 passes between the stump hooks 7 and legs 16a, 16b of the housing 16 to provide engagement between the following member 24 and stop member 19 during the cutting and crushing of tree stumps. The following member 24 and the stop member 19 are constructed and arranged to prevent destructive engagement between the cutting surface 22 and counter surface 9 by maintaining a small spacing or minimal contact pressure therebetween upon full closure of the bits 8 and 10.

The surfaces 9, 9' and 22, 22' intersect at similar angles as best shown in FIG. 5. This facilitates the provision of cam-like engagement between the following member 24 and stop member 19.

Referring to FIG. 4, the end wall 14 of the housing 16 has an arcuate configuration extending forwardly to the stump hooks 7. The tapered configuration of the housing 16 as described above provides the end wall 14 with an area sufficient to enable its use as a support base against the ground when prying a stump from the ground with stump hooks 7. The end wall 14 extends rearwardly to an edge 15. The wide edge 15 of the housing 16 and sidewalls 13, 14 associated therewith may be used as ground leveling edges and surfaces.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. A stump lifting and crushing means adapted to be mounted to an end of a manipulatable boom comprising a bit pivotally closable with a counter bit for crushing stumps therebetween, said bit and counter bit including an elongate narrow cutting surface and an aligned counter surface which cooperate to crush said stumps, said counter surface being substantially continuous and extending transversely across the width of the cutting surface upon closing pivotal movement of said bit and counter bit, said stump lifting and crushing means also including closure stop means for preventing destructive engagement of said cutting surface and counter surface upon closure of said bit and counter bit.

2. Means according to claim 1, wherein said closure stop means comprise a following member and a stop member provided by said bit and counter bit for cam-like engagement to prevent destructive engagement of said cutting surface and counter surface.

3. Means as in claim 2, wherein said bit and counter bit pivot about a common pivot axis.

4. A method of removing a rooted tree stump from the ground using a powered stump lifting and crushing apparatus including a housing having a substantially continuous end wall extending to a bifurcated forward portion including spaced hooks projecting away from an intermediately disposed counter bit and an opposed bit arranged for pivotally closing movement with said counter bit comprising the steps of pivotally opening said counter bit and bit, engaging said tree stump with said hooks and positioning said end wall against the ground adjacent the tree stump with said tree stump extending between said counter bit and bit, and prying the tree stump from the ground using said end wall as a support base working against the ground and pivotally closing said counter bit and bit to cut and crush said tree stump to facilitate stump removal.

5. A method as in claim 4, wherein said bit and counter bit respectively include an elongate cutting surface and a counter surface aligned with said cutting surface, and the step of pivotally closing said counter bit and bit includes engaging closure stop means provided by said apparatus for preventing destructive engagement of said cutting surface and counter surface upon closure of said bit and counter bit.

6. A method as in claim 5, wherein said closure stop means include a following member and a stop member respectively provided by said bit and counter bit, and the step of engaging said closure stop means includes slidingly engaging said following member along said stop member in a cam-like movement.

7. A method as in claim 6, wherein the steps of pivotally opening and closing said bit and counter bit include pivotally moving said bits about a common pivot axis.

8. A method as in claim 7, wherein said cutting surface includes a radially extending cutting portion projecting from said pivot axis and an angularly extending cutting portion projecting at an angle from said radially extending cutting portion, and the step of pivotally closing said bit and counter bit to cut and crush said tree stump includes grasping the tree stump with said angularly extending cutting portion cooperating with said hooks to restrict movement of the tree stump in a radially outward direction from said pivot axis.

9. A method as in claim 8, further including the step of leveling the ground by dragging an edge of said end wall remote from said hooks along the ground.

10. A method as in claim 4, further including powering said stump lifting and crushing apparatus by operably mounting it to a manipulatable boom.

* * * * *